Jan. 29, 1946.　　D. U. HUNTER　　2,393,779
SEALING STRUCTURE
Filed June 7, 1944
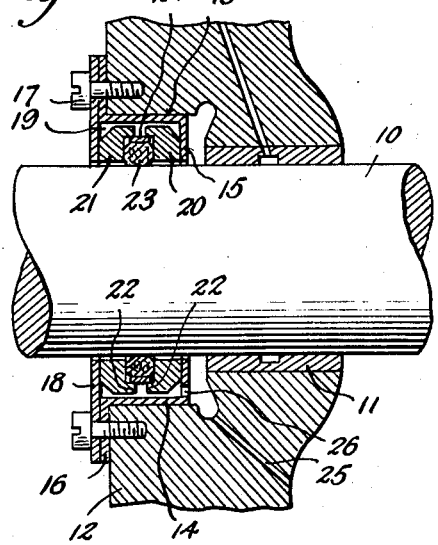
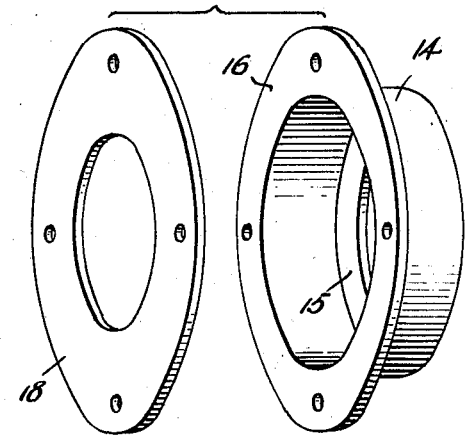
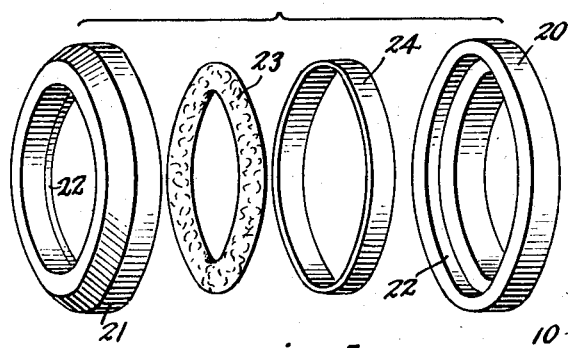
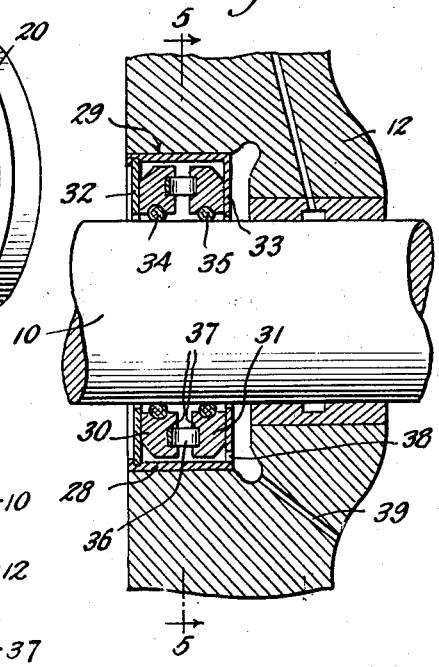
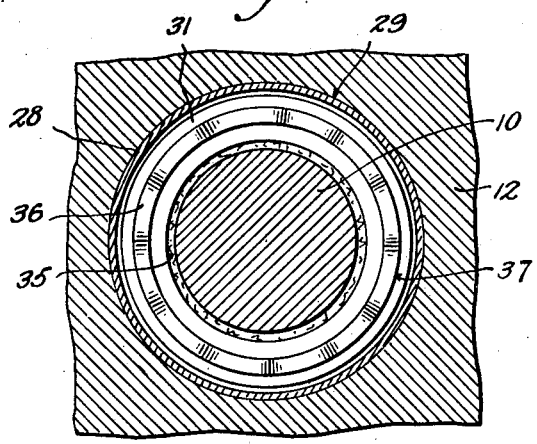
INVENTOR
David U. Hunter
BY Clark & Ott
ATTORNEYS Patented Jan. 29, 1946

2,393,779

UNITED STATES PATENT OFFICE 2,393,779

SEALING STRUCTURE

David U. Hunter, Millburn, N. J.

Application June 7, 1944, Serial No. 539,139

3 Claims. (Cl. 286—7)

This invention relates to a seal between fixed and rotating parts and the same has particular reference to a sealing structure which is highly efficient in operation, durable and capable of providing a seal for fluids under relative great pressure.

The invention has in view a sealing structure which includes sealing elements having engagement with fixed walls disposed in surrounding relation with the shaft and resilient means compressed into surrounding sealing engagement with the shaft to thereby effect rotation of said resilient means and said sealing elements with the shaft and the impingement of said sealing elements against said fixed walls to provide sealing engagement therewith.

The invention has for a further object a sealing structure formed as a unit and which includes a housing adapted to be secured in surrounding relation with the shaft and in which is mounted a pair of annular sealing elements and an annular resilient member compressed into surrounding sealing engagement with the shaft and against said sealing elements to thereby effect rotation of said sealing elements and said resilient member with the shaft and the impingement of said sealing elements against opposite walls of the housing to provide sealing engagement therewith.

The invention further provides a retaining means for said resilient member which constricts the same against outward expansion and causes it when compressed to snugly engage about the shaft and to be forced against said sealing elements to thereby expand the same laterally into impinging sealing relation against the housing.

With the foregoing and other objects in view, reference is now made to the following specification and accompanying drawing in which are illustrated the preferred embodiments of the invention.

In the drawing:

Fig. 1 is a vertical sectional view of a sealing structure constructed in accordance with the invention and showing the same in applied position.

Fig. 2 is an enlarged perspective view of the housing of the sealing structure with the parts thereof shown in separated juxtaposition.

Fig. 3 is an enlarged perspective view of the sealing elements with the same shown in separated juxtaposition.

Fig. 4 is a vertical sectional view of a modified form of sealing structure embodying the invention and showing the same in applied position.

Fig. 5 is a vertical sectional view taken approximately on line 5—5 of Figure 4.

Referring to the drawing by characters of reference and more particularly to the form of the invention illustrated in Figures 1 to 3 thereof, a shaft 10 is mounted for rotation in a bearing 11 forming part of a housing or casing 12 of a device such as a turbine, pump, compressor or other machine requiring a seal to prevent leakage of fluid between the shaft and bearing. The casing is preferably formed with an annular recess 13 opening through the forward face thereof and through which recess the shaft 10 protrudes. A cylindrical housing 14 is snugly fitted into said recess in surrounding relation with said shaft and is provided with inwardly and outwardly directed annular flanges 15 and 16 at the opposite peripheral edges thereof, the inwardly directed flange 15 being disposed in spaced relation with the inner face of the recess 13 and has its peripheral edge located adjacent to the shaft 10, while the outwardly directed flange 16 is secured by headed screws 17 in sealing relation with the casing 12 surrounding the recess 13. A face plate 18 secured by said screws 17 against the flange 16 in sealing condition therewith, has its inner peripheral edge located adjacent to and in surrounding relation with the shaft 10 and said plate together with the housing and the flange 15 thereof provide an annular recess 19 which surrounds the shaft.

A pair of annular sealing elements 20 and 21 are provided which are arranged in the recess 19 in surrounding relation with the shaft and in abutting engagement with the confronting faces of the flange 15 and plate 18. The sealing elements 20 and 21 and the flange 15 and plate 18 preferably are provided with smooth or ground co-acting faces and the sealing elements are constructed of a material having a low coefficient of friction such as carbon or hard rubber impregnated with carbon so that the sealing elements will closely fit against said co-acting faces of the plate 18 and flange 15 to provide sealing engagement therewith and at the same time reduce wearing action and friction to a minimum.

The said sealing elements are rabbeted about their confronting inner peripheral edges to thereby form confronting annular beads 22 and providing an annular recess between said beads and the shaft 10 in which recess is arranged a resilient member 23 engaging about the shaft and a retaining band 24 surrounding said resilient member. The resilient member 23 is preferably formed of compressible rubber or synthetic material such as Vinylite or Duprene which are resistant to oil and grease and provide satisfactory resilient and compressible qualities. The same is preferably of circular or oval shape in cross-section so that when the plate 18 is tightened against the flange 16, the resilient member will be constricted and compressed between the sealing elements 20 and 21 and between the shaft 10 and retaining band 24 which is preferably of metal. This functions to compress the sealing member from its normal cross-sectional formation into flattened sealing relation with the shaft 10 and into flat resilient engagement against the sealing elements to force the same apart and into impinging and sealing relation with the smooth co-acting faces defined by the flange 15 and plate 18 of the housing 14.

The housing 14 being sealed in the recess 13 by the screws 17 and the resilient member and sealing elements providing a seal about the shaft and with the confronting inner faces of the housing, effectively prevents the escape of fluid which may seep out between the bearing 11 and shaft 10. It will be understood that the sealing elements, the resilient member and the retaining band rotate as a unit with the shaft 10 and that the only wearing action is between the co-acting abutting faces of the sealing elements and confronting walls of the housing 14. The casing 12 is provided with a drain 25 extending downwardly from the lowermost portion of the recess 13 between the housing 14 and the inner face thereof and which opens through the inner face of the casing for draining off any fluid or liquid which may seep past the bearing 11 and shaft 10. The housing 14 adjacent the juncture of the flange 15 therewith is also provided with a discharge opening 26 at the lowermost portion thereof through which liquid or fluid may escape into the recess 13 and be discharged through the drain 25.

In the form of the invention illustrated in Figures 4 and 5 of the drawing, a sealing structure is similarly arranged between the shaft 10 and a housing 28 fitted into a recess 29 in the casing 12. The sealing structure in this form of the invention includes a pair of sealing elements 30 and 31 similarly fashioned of carbon or hard rubber impregnated with carbon and which are disposed in surrounding relation with the shaft and have bearing engagement with the confronting faces of the inwardly directed walls 32 and 33 of the housing 28. A pair of annular resilient members 34 and 35 similar to the resilient member 23 in the previous form of the invention but somewhat smaller in cross-section, are disposed in surrounding relation with the shaft 10 and are compressed between the said shaft and the sealing elements 30 and 31 respectively to thereby seal the space surrounding the shaft and between the same and the sealing elements respectively.

The sealing structure also includes an undulating spring 36 of annular formation in plan which is arranged between the sealing elements 30 and 31 with the oppositely curved or undulating portions thereof disposed in the confronting annular channels 37 in the adjacent side faces of the sealing elements and which spring functions to resiliently force the sealing elements apart and into impinging engagement with the confronting faces of the walls 32 and 33 of the housing 28 to provide a seal therewith. The housing 28 is similarly provided with a drain opening 38 for draining off any fluid or liquid which may collect in the bottom of the housing while the casing 12 is provided with an opening 39 for discharging any fluid or liquid which may collect in the recess between the housing and the inner face thereof.

The housing 28 being sealed in the recess 29 and the sealing structure providing a seal between the shaft and the housing, effectively seals the shaft and prevents the escape of fluid about the same.

What is claimed is:

1. In a sealing structure for preventing leakage of fluid between a rotating shaft and a fixed part surrounding said shaft, a housing secured to said fixed part and having spaced apart inwardly directed peripheral walls disposed in surrounding spaced relation with said shaft and formed with smooth confronting faces and providing an annular recess therebetween, a pair of carbon rings located in said recess in surrounding relation with said shaft and having smooth faces disposed against the smooth confronting faces of said walls respectively, an annular resilient member disposed between said carbon rings and in surrounding resilient engagement with said shaft and a metallic band surrounding said resilient member and between which band and the shaft the resilient member is distorted from its normal formation by compression into sealing engagement with the shaft and laterally against said carbon rings to cause said resilient member and said metallic band and said carbon rings to rotate with said shaft and the carbon rings to impinge against the smooth faces of said walls of the housing to form a seal therewith.

2. In a sealing structure for preventing leakage of fluid between a rotating shaft and a fixed part surrounding said shaft, a housing secured to said fixed part and having spaced apart inwardly directed peripheral walls disposed in surrounding spaced relation to said shaft and providing an annular recess with said walls, a pair of annular sealing elements having a low coefficient of friction located in said recess in surrounding relation with said shaft, an annular resilient member having a normally curved periphery disposed between said sealing elements and a retaining band surrounding said resilient member and between which band and the shaft the resilient member is distorted from its normal formation by compression into flattened sealing engagement with the shaft and against said sealing elements to effect rotation of said sealing elements and said resilient member and said band with the shaft and the impingement of said sealing elements against the peripheral walls of the housing to provide a seal therewith.

3. In a sealing structure for preventing leakage of fluid between a rotary shaft and a surrounding part having spaced apart inwardly directed fixed annular walls disposed in surrounding spaced relation with said shaft and providing an annular recess surrounding the shaft, a pair of sealing elements having a low coefficient of friction located in said recess in surrounding relation with said shaft, an annular resilient member disposed between said sealing elements in surrounding engagement with said shaft and a retaining band surrounding said resilient member and between which band and the shaft the resilient member is distorted from its normal formation by compression into sealing engagement about the shaft and against said sealing elements to effect impingement of said sealing elements against the walls of the fixed part to provide a seal therewith.

DAVID U. HUNTER.